E. T. GRAY AND A. T. HOEVET.
COMBINED SIGNAL BOX AND SEARCHLIGHT FOR VEHICLES.
APPLICATION FILED MAY 8, 1919. RENEWED JUNE 9, 1920.

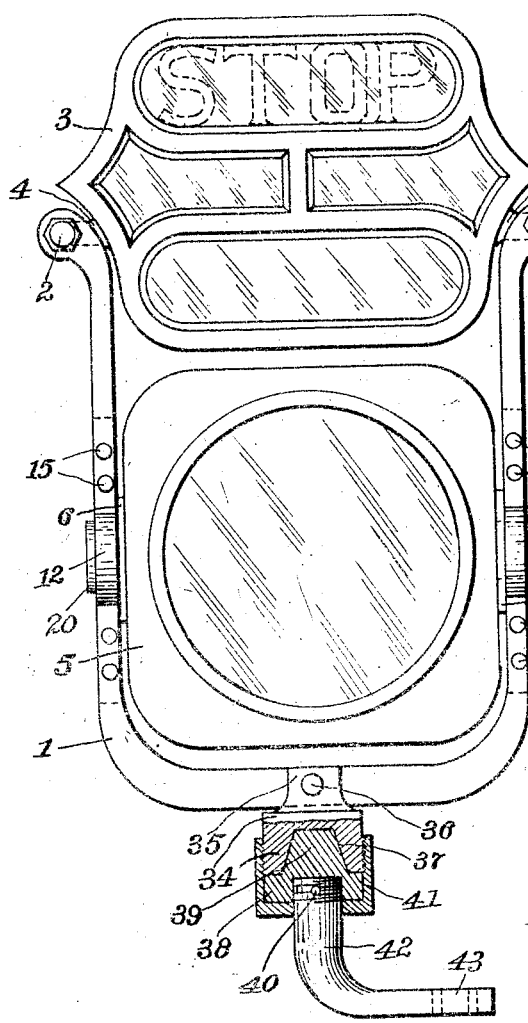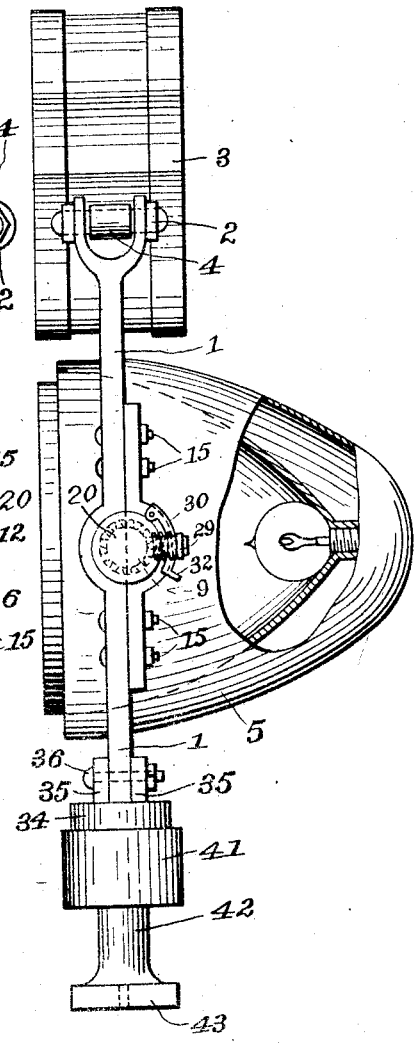

1,364,748.

Patented Jan. 4, 1921.
2 SHEETS—SHEET 2.

Inventors:
Edwin T. Gray and
Alfred T. Hoevet
By Frederick V. Winters
Attorney.

UNITED STATES PATENT OFFICE.

EDWIN T. GRAY AND ALFRED T. HOEVET, OF NEW YORK, N. Y.; SAID HOEVET ASSIGNOR TO SAID GRAY.

COMBINED SIGNAL-BOX AND SEARCHLIGHT FOR VEHICLES.

1,364,748.   Specification of Letters Patent.   Patented Jan. 4, 1921.

Application filed May 8, 1919, Serial No. 295,810. Renewed June 9, 1920. Serial No. 387,720.

*To all whom it may concern:*

Be it known that we, EDWIN T. GRAY and ALFRED T. HOEVET, citizens of the United States, residing at New York, in the county and State of New York, have invented a new and useful Combined Signal-Box and Searchlight for Vehicles, of which the following is a full, clear, and exact specification.

This invention relates to signal boxes and search lights for vehicles, and has for its object to provide improved means for conveniently mounting or supporting a signal box and a search light on an automobile or other vehicle. The signal box is designed to carry a dash lamp in addition to its signal lamps, so that the structure contemplated includes a combined search light, dash lamp and signaling lamps.

Another object of the invention is to provide improved means for adjusting the search light at different inclinations, and for holding the same firmly in each adjustment. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a front elevation of a signal box and search light mounted on a supporting bracket constructed substantially in accordance with this invention, the coupling at the base of said bracket being shown in section.

Fig. 2 is a broken side elevation of the device as shown in Fig. 1.

Fig. 8 is a detailed end view of the locking bolt.

The supporting bracket 1 is U-shaped and its substantially parallel vertical arms have their upper end portions connected by bolts 2 to ears 4 on the opposite sides of the signal box 3, whereby said signal box is supported rigidly and against movement in any direction relative to the bracket 1. The signal box illustrated is similar to that disclosed in our Patent No. 1,196,736, issued August 29, 1916, and contains a plurality of compartments for signaling purposes and a compartment for a dash lamp. It will be understood, however, that any other suitable form of signal box may be used in place of the one shown, if desired.

Figure 4:
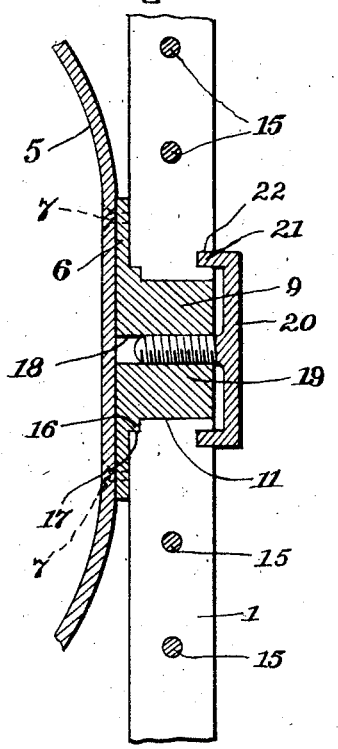
Fig. 4 is a section on the line IV—IV of Fig. 3, showing part of the casing of the search light to which the pivots are secured.
Figure 5:
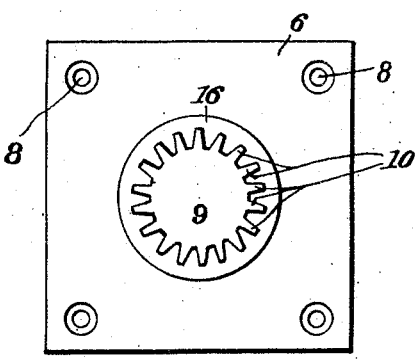
Fig. 5 is a detailed elevation of one of the pivots for the search light.
Figure 6:
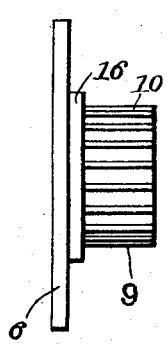
Fig. 6 is a side view of the same.
Figure 7:
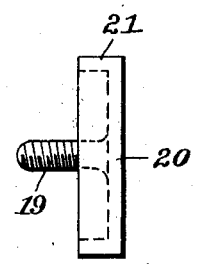
Fig. 7 is a detailed view of the cap bolt used for fastening the pivot in the bracket and for excluding rain and dust from the joint.

Below the signal box a search light 5 is pivotally supported between the arms of the bracket 1 by means of pivots secured to each side of the casing of said search light and rotatably mounted in bearings in said arms. Each pivot consists of a plate 6 having openings 8 for the passage of screws 7, Fig. 4, for securing said plate to the casing of the search light 5, a trunnion 9 having axial teeth 10 therein, and a flange or annular ridge 16 at the juncture of said plate 6 and trunnion 9. The bearing 11 for the pivot or trunnion is formed in each of the arms of the bracket 1 by offsetting an intermediate portion thereof, as at 12, and attaching a strap 14 having a supplemental offset portion 13 by means of bolts 15 or other suitable fastening means. The inner face of the bearing has an annular recess 17 to receive the flange 16 which fits closely therein and prevents rain or dust from entering into the bearing from the inside end thereof. The outer end of the bearing has an annular groove 22 into which a peripheral flange 21 on a cap bolt 20 extends when said bolt has its threaded stem 19 screwed into a central passage or socket in the trunnion, as shown in Fig. 4. Said cap flange 21 and groove 22 serve to exclude rain and dust from entering the bearing from the outside.

Figure 3:
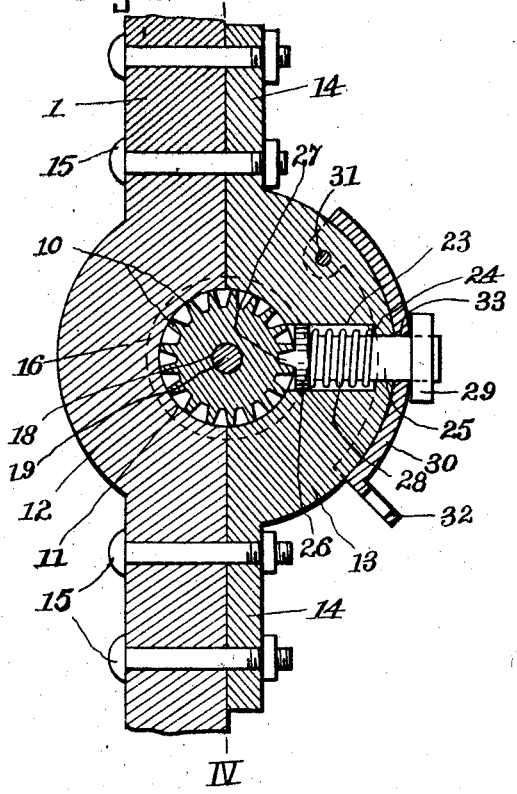
Fig. 3 is a section through one of the pivots of the search light drawn to a larger scale.

To retain the search light at different inclinations to which it may be turned on its pivots or trunnions, a spring pressed bolt or locking member 25 is mounted in a socket or chamber 23 in each bearing. In the outer end of the socket 23 there is a shoulder or ledge 24, while on the inner end of said bolt 25 there is an enlarged head 26, and between said head and ledge a spring 28 is coiled about the bolt so as to normally press the head toward the trunnion so that a tooth 27 carried by said head will engage between adjacent teeth 10 on said trunnion, as illustrated in Fig. 3. The outer end portion of the bolt 25 extends through an opening 33 in a trigger 30 which is pivoted at 31 to the bearing and has a finger piece 32 at its free end. Said trigger is preferably made in channel form to fit over the edge of the bearing part 13, and the bolt is secured to the trigger by a nut 29, so that when the said trigger is swung on its pivot 31 away from the bearing the bolt 25 will be moved outwardly against the spring to withdraw the tooth 27 from between the teeth on the trunnion, thus permitting the search light to swing to a new position in which it may be locked by releasing the trigger whereupon the spring will advance the tooth 26 with the bolt to engage between adjacent teeth on the trunnion again.

The bracket 1 may be fastened to any desired part of the automobile or vehicle in any suitable manner, but in Figs. 1 and 2 there is illustrated one preferred form of coupling which consists of a member 34 secured to the bracket, and another member 38 secured to a post 42 having an angularly bent arm 43 adapted to be secured to any fixed part of the vehicle. The coupling member 34 has a pair of spaced lugs 35 to embrace the lower edge of the bracket 1 and to which they are fastened by a bolt 36. The member 34 also has a socket 37 which may be angular or round in cross section. The supplemental coupling member 38 has a lug 39 to fit the socket 37, and is screwed onto the upper end of the post, as shown in Fig. 1, and locked by a pin 40. The lug 39 and socket 37 are preferably tapered so as to insure a tight joint, and the members are connected by a union 41 carried by one member and screwing onto the other member.

Having thus described our invention, what we claim as new and desire to secure by Letters Patent of the United States is:—

1. The combination with a bracket having spaced arms, of smooth bored bearings on said arms, a search light having trunnions with notched peripheries journaled in said smooth bearings, and locking bolts extending into the bearings and having teeth on their inner ends to engage the notches in the trunnions for retaining the search light in adjusted position.

2. The combination with a bracket having spaced arms, of bearings on said arms, a search light having notched trunnions journaled in said bearings, spring-pressed bolts carried by the bearings and having teeth to engage the notches in the trunnions for normally retaining the search light in adjusted position, and a trigger connected to each of said bolts for moving the same against the springs to withdraw the teeth from the notches in the trunnions to permit a new adjustment of the search light.

3. The combination with a bracket having spaced arms, of bearings on said arms, a search light having notched trunnions journaled in said bearings, spring-pressed bolts carried by the bearings and having teeth to engage the notches in the trunnions for normally retaining the search light in adjusted position, a trigger on the outside of the bearing on each arm and through which trigger the corresponding bolt extends, and a nut on the outer end of each bolt for connecting the same to its trigger.

4. The combination with a bracket having spaced arms, of bearings on said arms, a search light having notched trunnions journaled in said bearings, spring-pressed bolts carried by said bearings and having teeth to engage the notches in the trunnions for normally retaining the search light in adjusted position, and a trigger mounted on each bearing and connected to the corresponding bolt for withdrawing it from the notches in the trunnion, said triggers being of channel form to embrace the edges of the bearings.

In testimony whereof we have signed our names to this specification.

EDWIN T. GRAY.
ALFRED T. HOEVET.